US008146466B1

(12) United States Patent
Slack

(10) Patent No.: US 8,146,466 B1
(45) Date of Patent: Apr. 3, 2012

(54) CARVING VISE

(76) Inventor: George Lee Slack, Warrenton, VA (US)

( * ) Notice: Subject to any disclaimer, the term of this patent is extended or adjusted under 35 U.S.C. 154(b) by 236 days.

(21) Appl. No.: 11/977,689

(22) Filed: Oct. 25, 2007

(51) Int. Cl.
*B23B 19/02* (2006.01)
*B23B 23/00* (2006.01)

(52) U.S. Cl. ............................................ 82/142; 82/148

(58) Field of Classification Search .................... 82/142, 82/148, 150, 170; 29/90.01; 144/135.2
See application file for complete search history.

(56) References Cited

U.S. PATENT DOCUMENTS 2,016,365 A * 10/1935 Dumser et al. .................. 82/117
2,559,360 A * 7/1951 Kurzweil ..................... 29/90.01
6,058,988 A * 5/2000 Hardesty .................... 144/135.2

* cited by examiner

*Primary Examiner* — Will Fridie, Jr.

(57) ABSTRACT

1) The carving vise holds an article to be carved at optimal positions for ease of carving. Its design reduces carvers fatigue; damage to the carving article while being held; and the likelihood of carving injuries. It also greatly improves the carvers carving efficiency.

2) Significant design features are the reduction in the amount of repositioning release mechanisms to reposition the craving article. The design is unique in that the carving article can be moved in three ways. Rotated 360 degrees around the head and tail stock axis, 2) rotated 90 degrees relative to the work bench to which it is mounted, 3) slides in and out relative to the mounting point. The head and tail stock will move independently and also can be repositioned while securely holding a carving article by moving the square tube assembly. The locking mechanism for rotational movement and the brake assembly for locking the vise in vertical positions are new simplistic designs that securely lock in all positions.

3) The vise is constructed of steel for durability as well as providing slenderness by design for minimal interference to the carver during the process of carving.

1 Claim, 15 Drawing Sheets

CARVING VISE

BRIEF SUMMARY OF THE INVENTION

The carvers vise is portable or permanently mountable. It provides a quick method for holding and articulating a carving article without damage. It allows the carver to more easily, rapidly and safely carve an item without undo fatigue. Carving articles of various sizes and shapes can to be rapidly repositioned to facilitate carving for carvers of various physical sizes.

BACKGROUND OF THE INVENTION

The process of building high style 18$^{th}$ century furniture as well as other high end furniture requires an enormous amount of shaping and carving to create components such as cabriole legs for chairs, tables, and case pieces with various style feet such as claw and ball, trifed, and Spanish style foot. The rear legs of some side chairs. Quarter columns and decorative poster bed posts has always been a challenge for the carver to secure for carving and shaping purposes because of their large size. Of an equal challenge are very short articles such as rosettes, finials and legs for chests of drawers. In order to speed up the carving process it became necessary to be able to effectively hold a variety of carving article sizes and shapes in a way not to damage the carving article; improve safety for the carver and generally improve the carver's quality and speed of carving by reducing fatigue. The vise described in this patent application revolutionizes the carving process for the furniture carver/cabinetmaker. Development of the vise took several years of use in the shop environment to develop and to perfect so it would fulfill the need of today's cabinetmaker/woodcarver. Application for this type of vise goes well beyond carvers and woodworkers.

DETAILED DESCRIPTION OF THE INVENTION

The carving vise is designed to hold objects of various sizes and shapes and allow them to be easily articulated for carving. The carving article [14] is secured between the head [10] and tail stock [4] and secured by tightening the press screw [13]. The carving article can be moved in three ways. 1) rotated 360 degrees around head and tail stock axis; 2) rotated up and down 0 to 90 degrees relative to the work bench that it is mounted; 3) slide in and out relative to the mounting point. The head and tail stock will move independently along square rods [1] to accommodate various length carving articles. The carving article while being held in place can be repositioned by moving the square rods relative to the mounting point. The above repositioning capability allows the carving object to be relocated to accommodate different height carvers to reduce fatigue, facilitate and improve carving efficiency.

Different lengths Square rods assemblies can be interchanged to accommodate holding various size carving articles. Three different Square rod assembly lengths have been optimized for holding a variety of carving articles ranging from 0 to 86 inches in length when being used in a typical cabinetmakers shop. Carving articles with diameters up to 8 inches can be held in the vise.

The rotator release [5] which is an integral part of the tail stock allows the carving article to be continuously positioned 0 to 360 degrees in either direction the clockwise or counter clockwise direction by a releasing knob [5] which squeezes a friction fit shaft to keep it from rotating. The rotator release allows the carving article to be rotated in the vise without loosening the press screw.

The mounting base thimble assembly [11] contains a braking mechanism that employs a composite material that when tightened against the hub forms a braking action. Operationally the base/thimble brake subassembly provides two positioning functions: 1) allows the square rod assembly to be positioned continuously from horizontal to a fully vertical position (0 to 90 degrees), 2) and it allows the square rods to be shifted within the brake assembly to move the object to a comfortable position for the carver. The brake release lever [3] has a spider mechanism to allow the lever to be repositioned after the brake action is secured so not to interfere with the carving operation.

The mounting base can be secured to a work bench with a "C" clamp or it can be permanently mounted.

DRAWING DESCRIPTIONS

Figure 1:
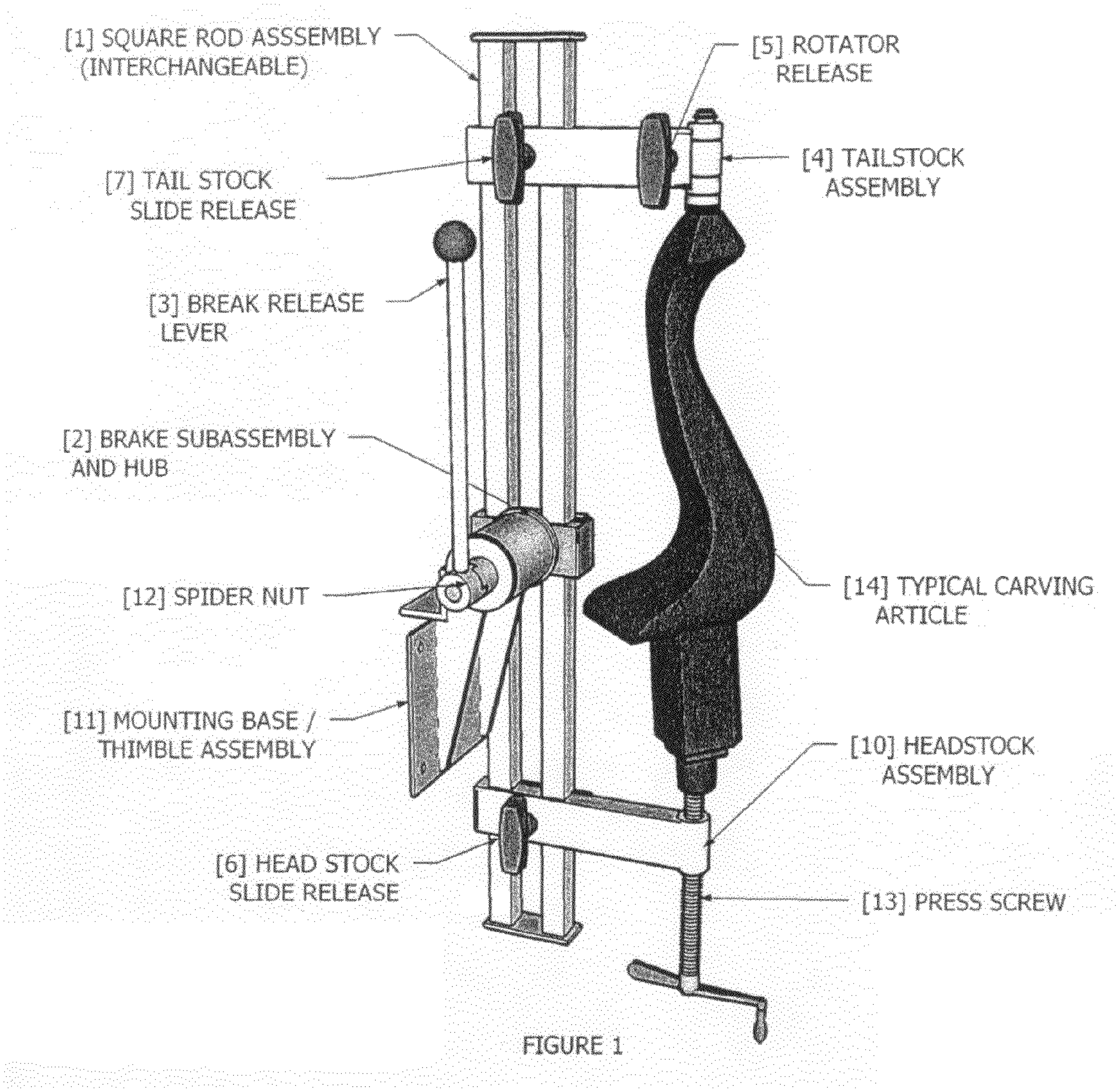
FIG. 1 Depicts a front view isometric drawing of the carving vise with a definition of subassemblies.
Figure 2:
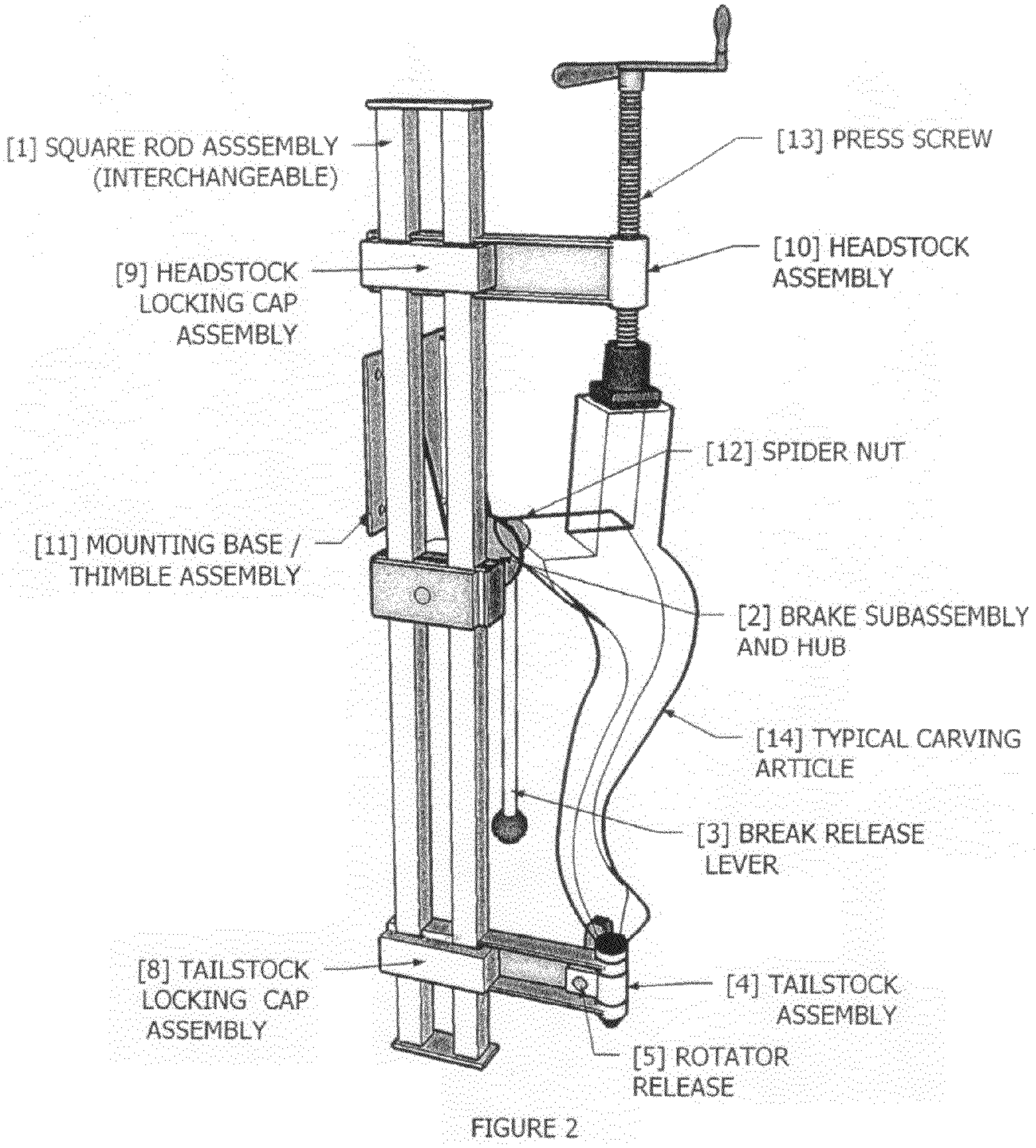
FIG. 2 Depicts a back view isometric drawing of the carving vise with a definition of assemblies and subassemblies.
Figure 3:
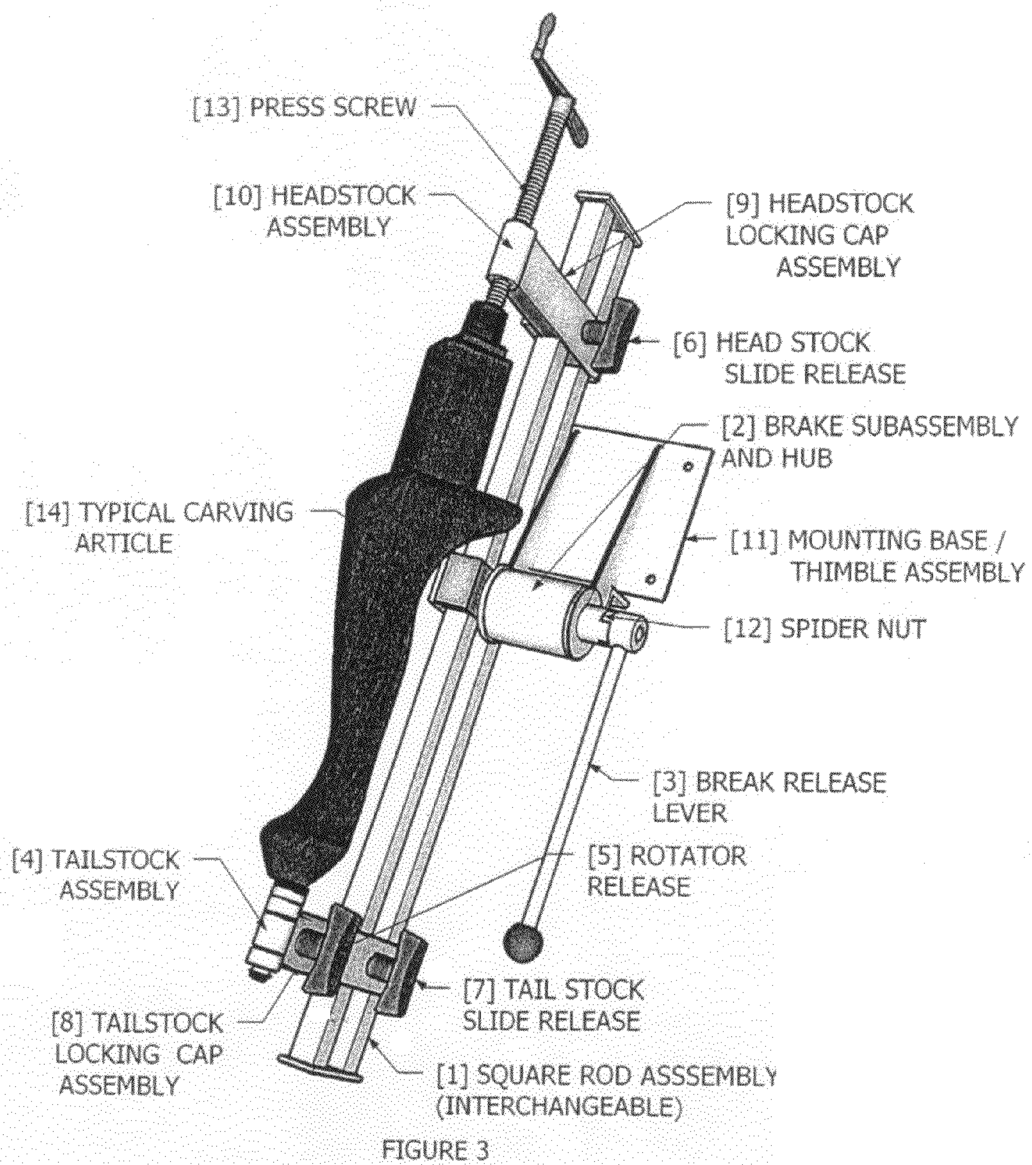
FIG. 3 Depicts a top view isometric drawing of the carving vise with a definition of assemblies and subassemblies.
Figure 4:
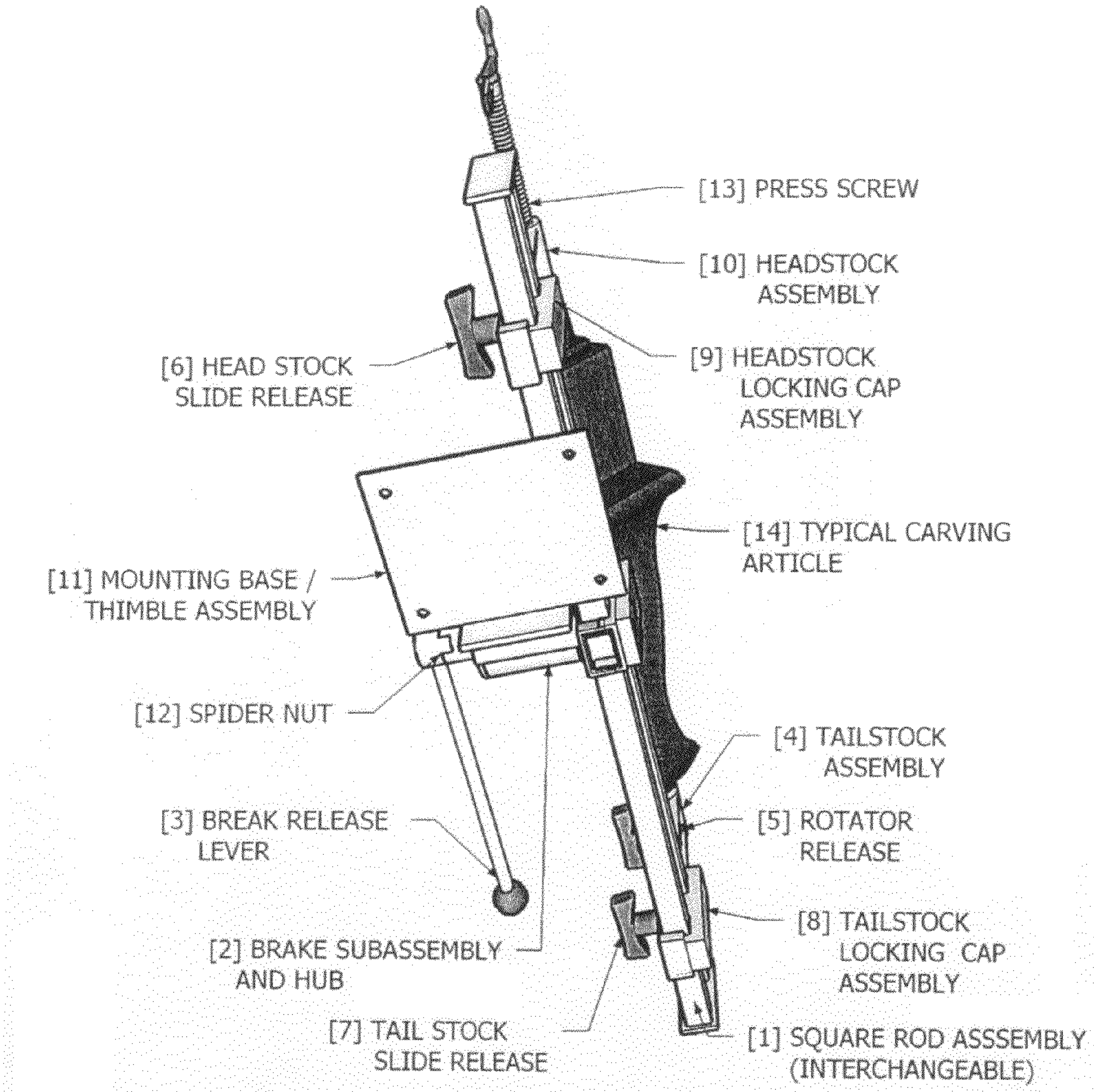
FIG. 4 Depicts a bottom view isometric drawing of the carving vise with a definition of the assemblies and subassemblies.
Figure 5:
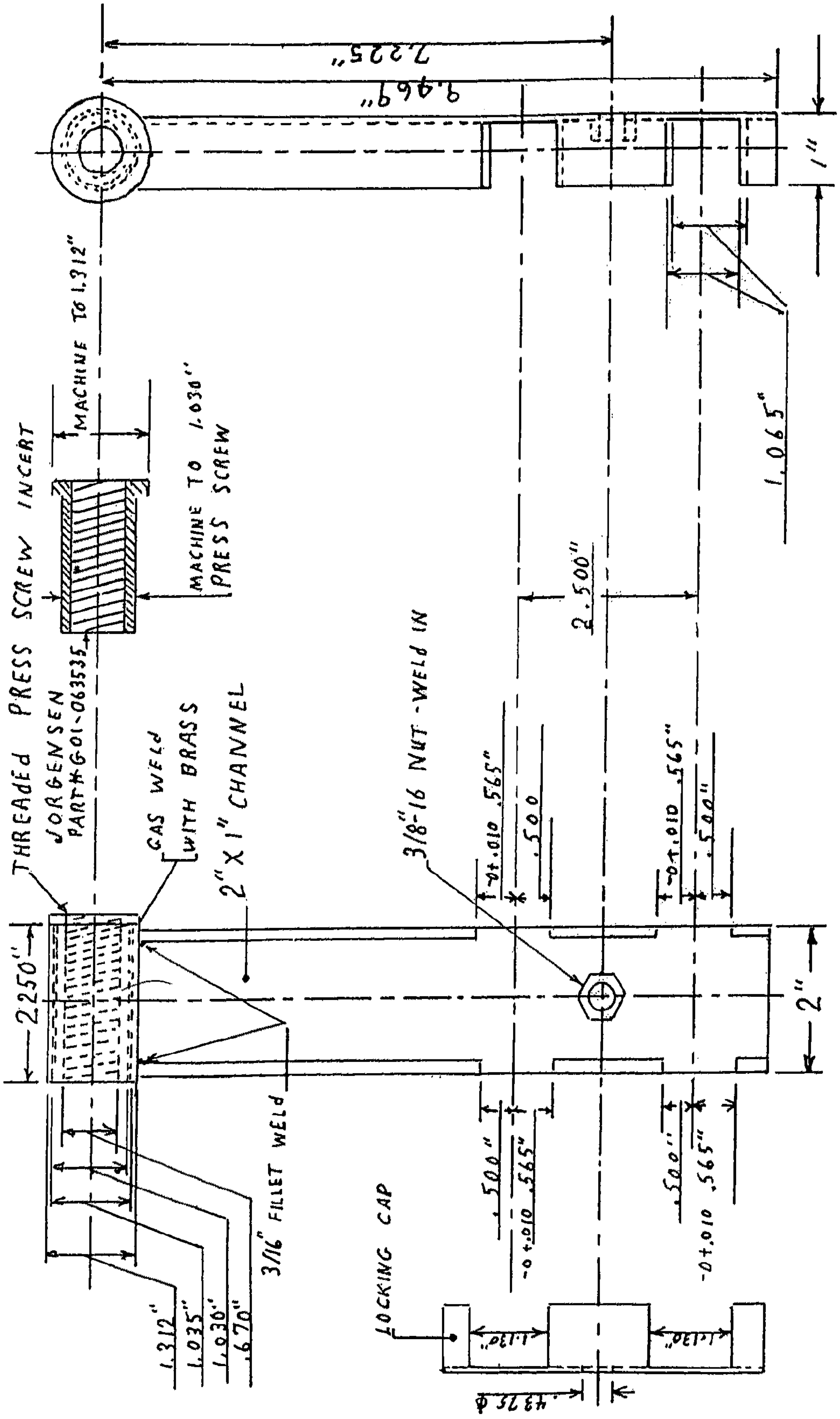
FIG. 5 Depicts a detailed manufacturing drawing for the press screw head stock.
Figure 6:
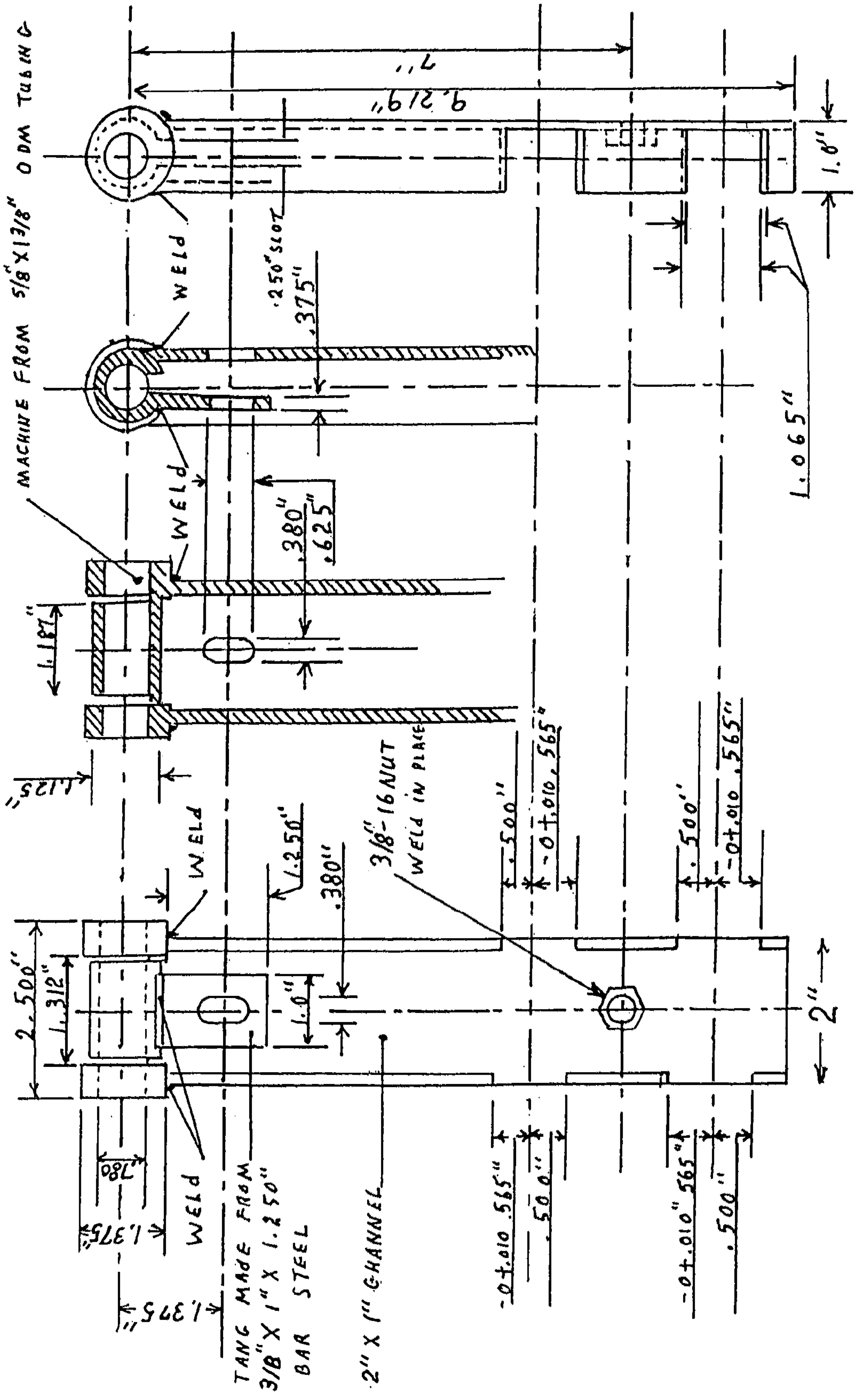
FIG. 6 Depicts a detailed manufacturing drawing of the end support for the carving vice tail stock.
Figure 7:
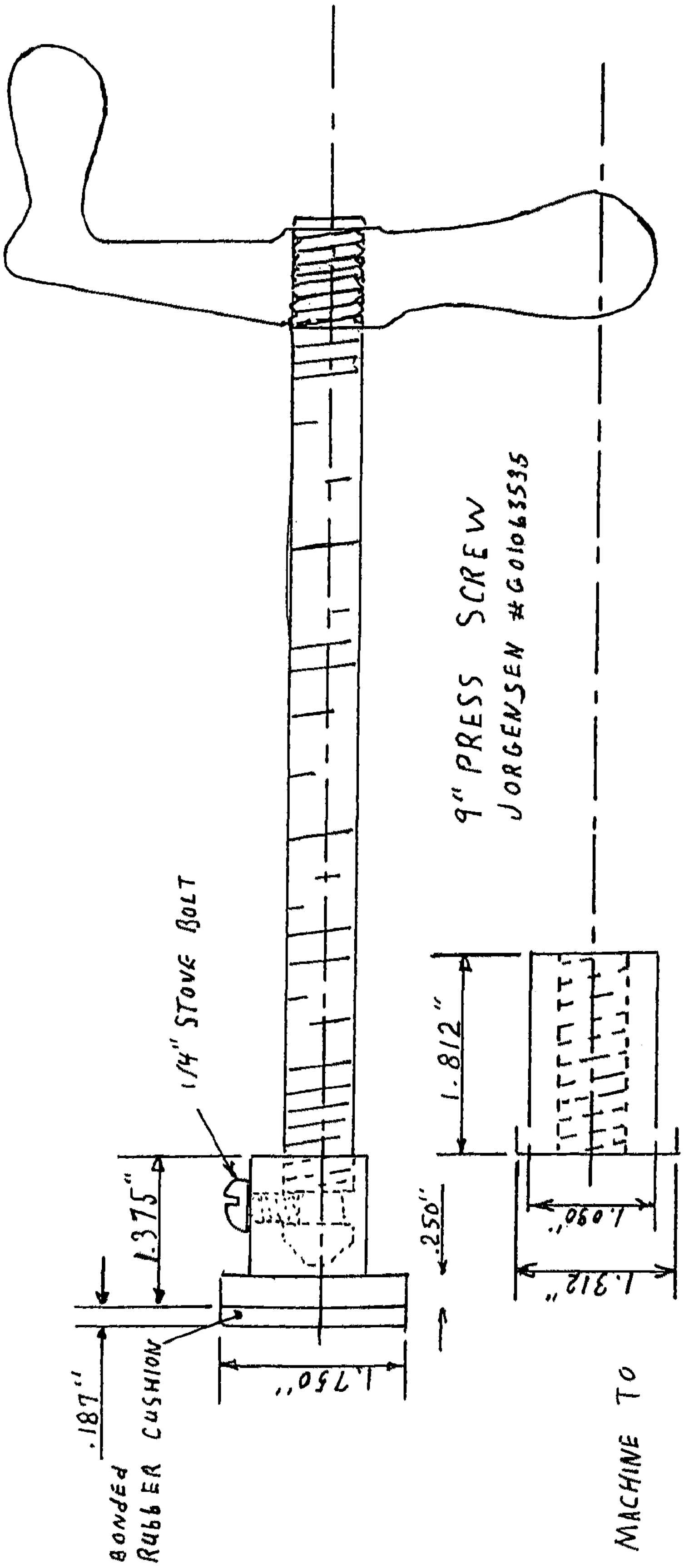
FIG. 7 Depicts the press screw that is a part of the head stock.
Figure 8:
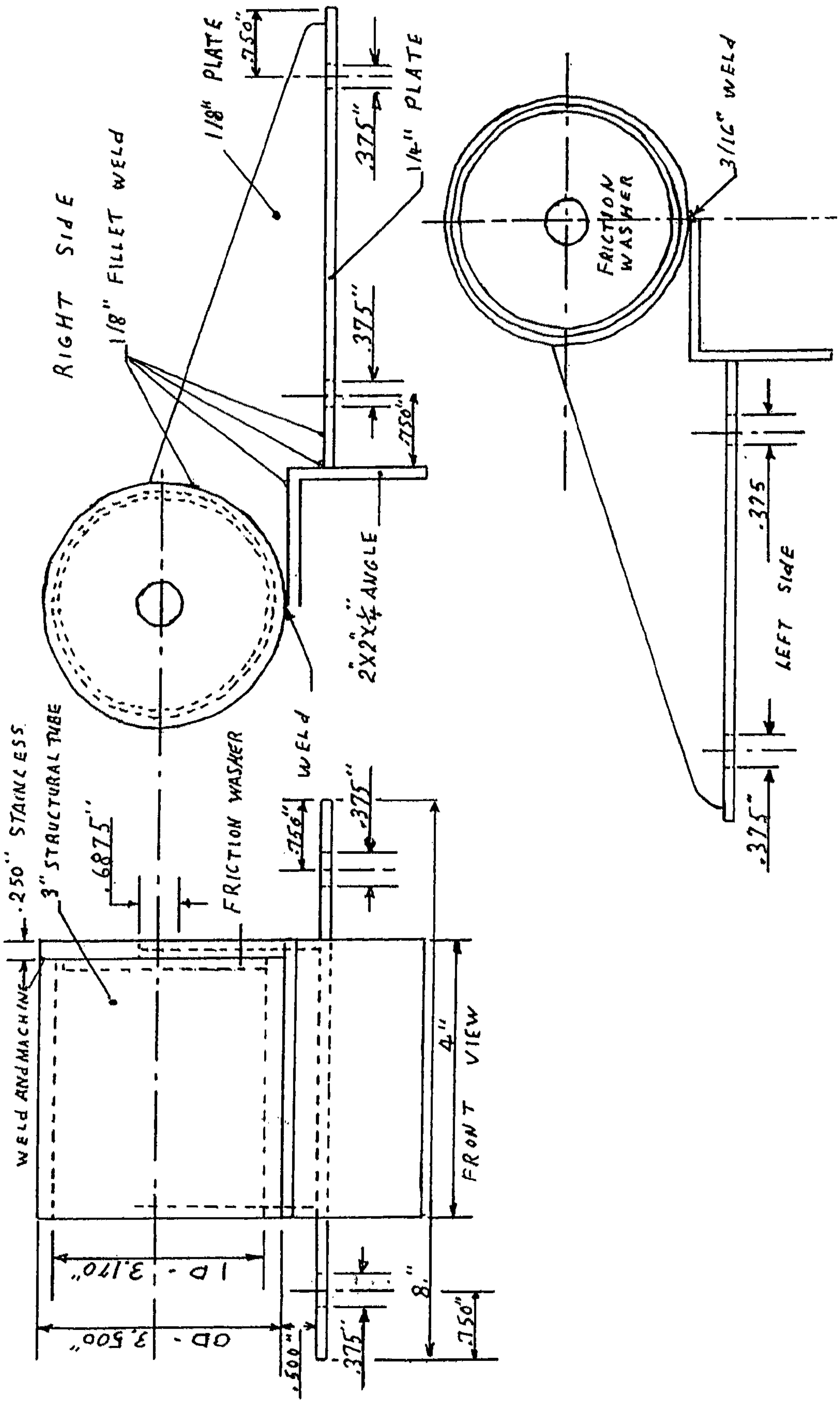
FIG. 8 Depicts side view of a detailed manufacturing drawing for the base/thimble assembly.
Figure 9:
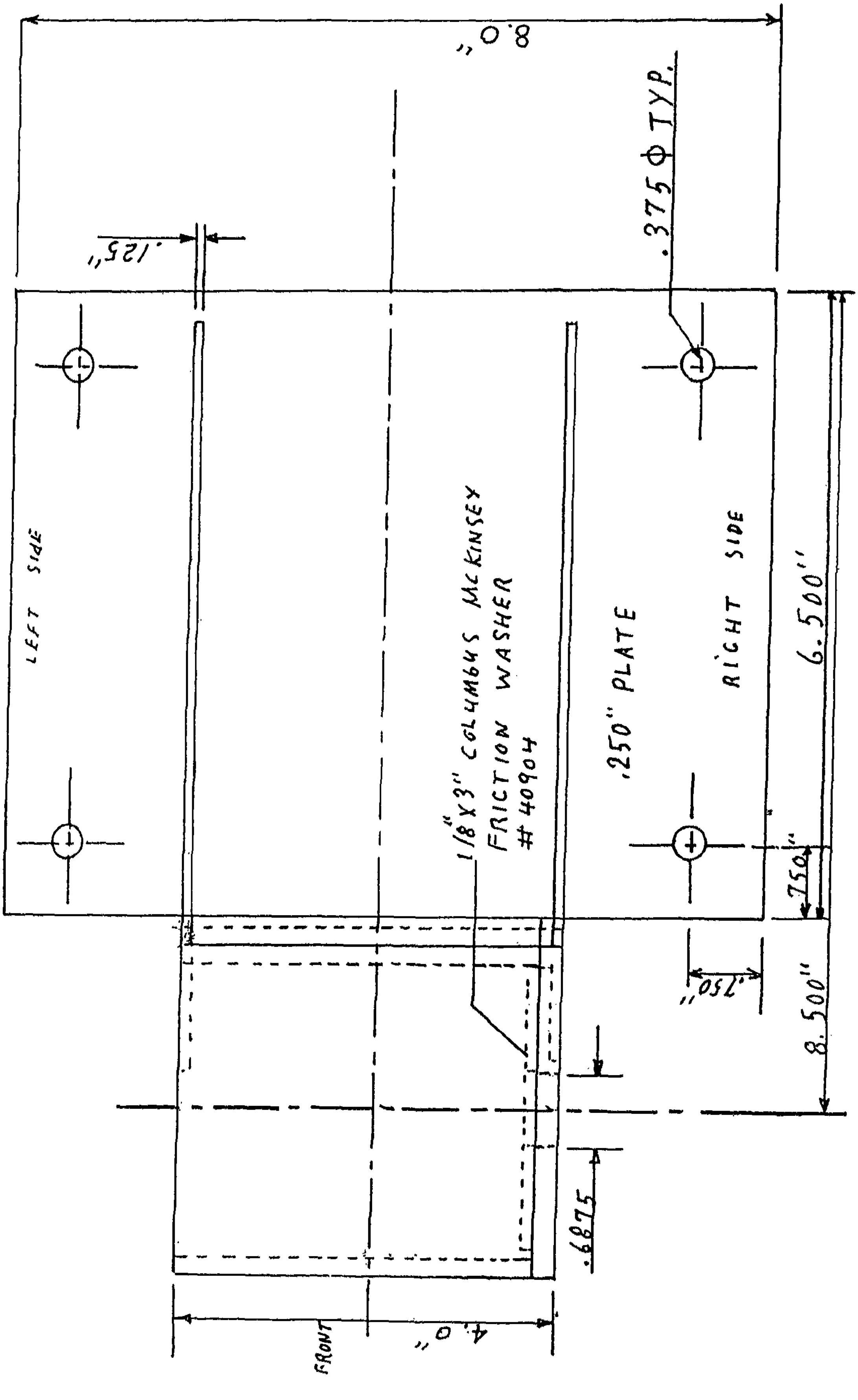
FIG. 9 Depicts plan view of a detailed manufacturing drawing for the base thimble assembly.
Figure 10:
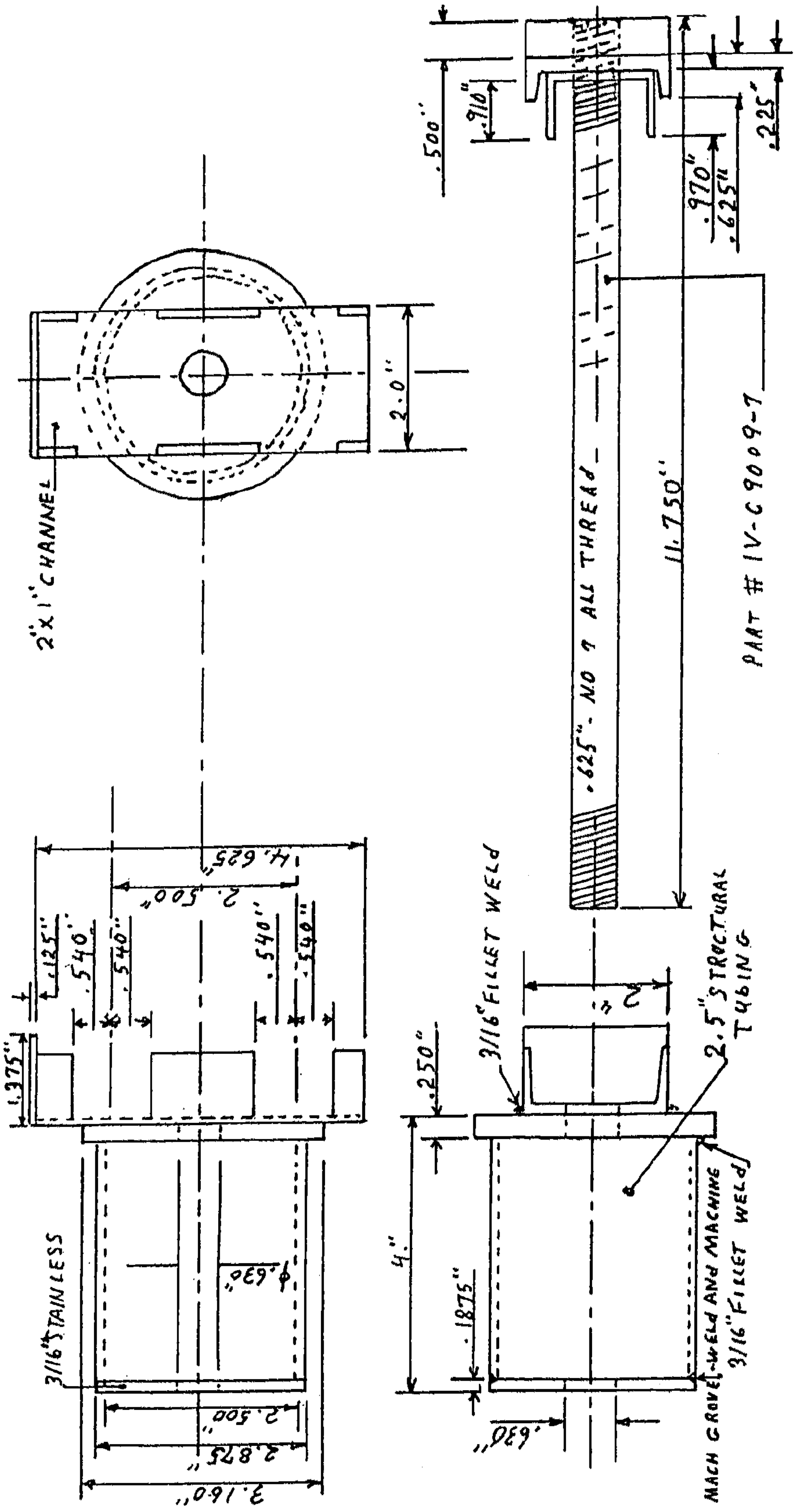
FIG. 10 Depicts views of a detailed manufacturing drawing for the drum which is an integral part of the mounting base/thimble subassembly.
Figure 11:
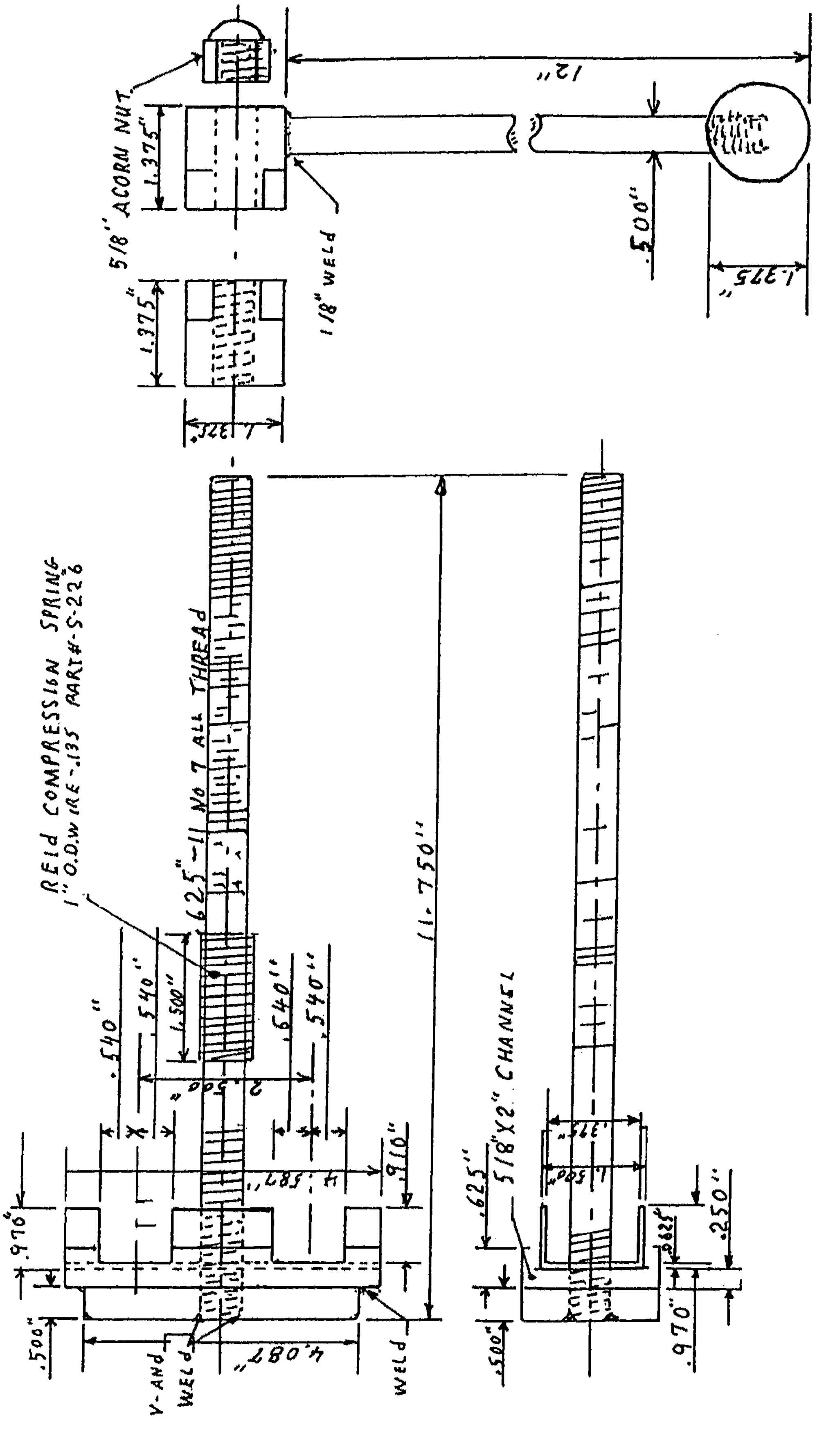
FIG. 11 Depicts views of a detailed manufacturing drawing for the lock screw and clutch release handle which is an integral part of the base thimble assembly.
Figure 12:
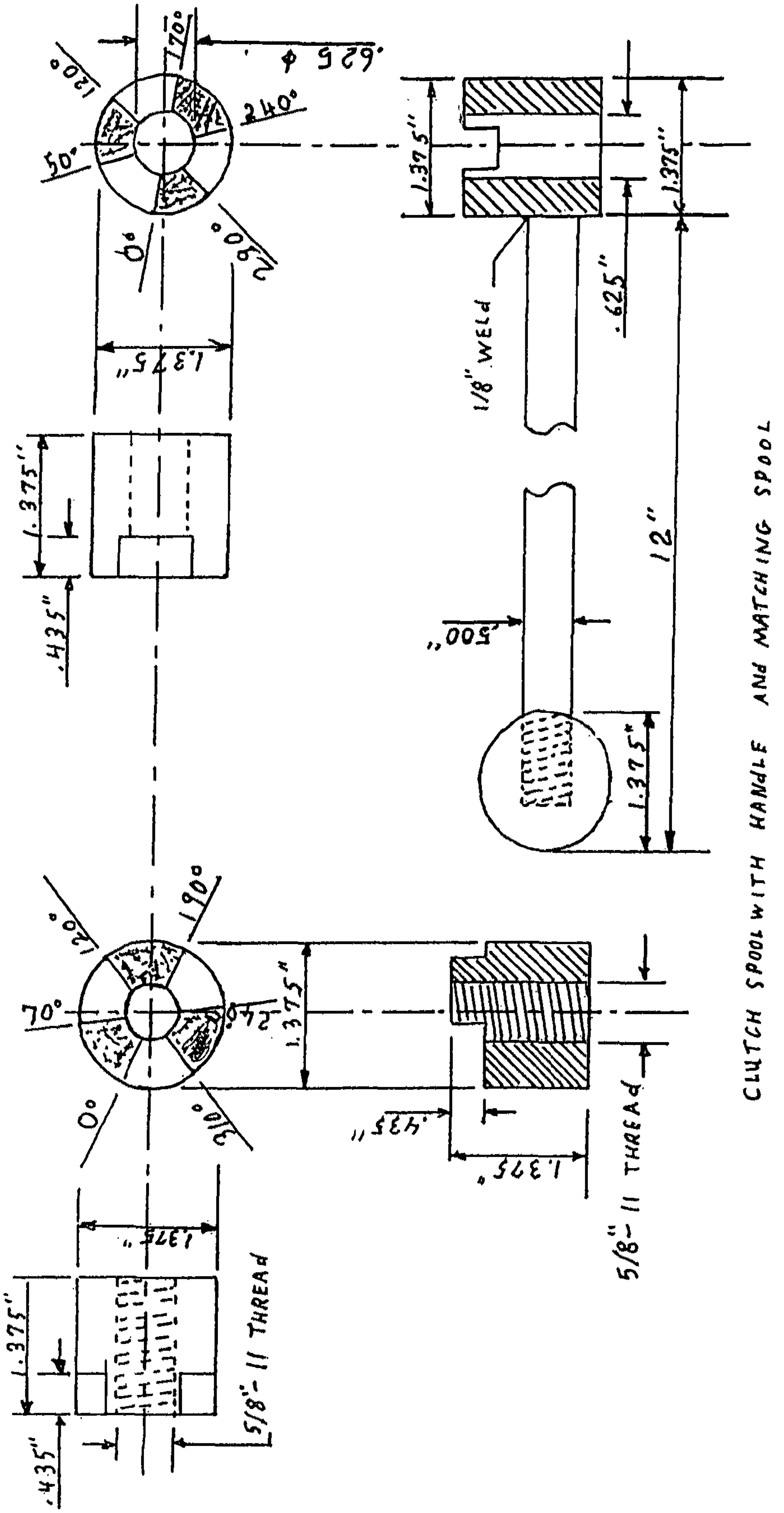
FIG. 12 Depicts a detailed manufacturing drawing for the brake release lever which is an integral part of the mounting base/thimble assembly.
Figure 13:
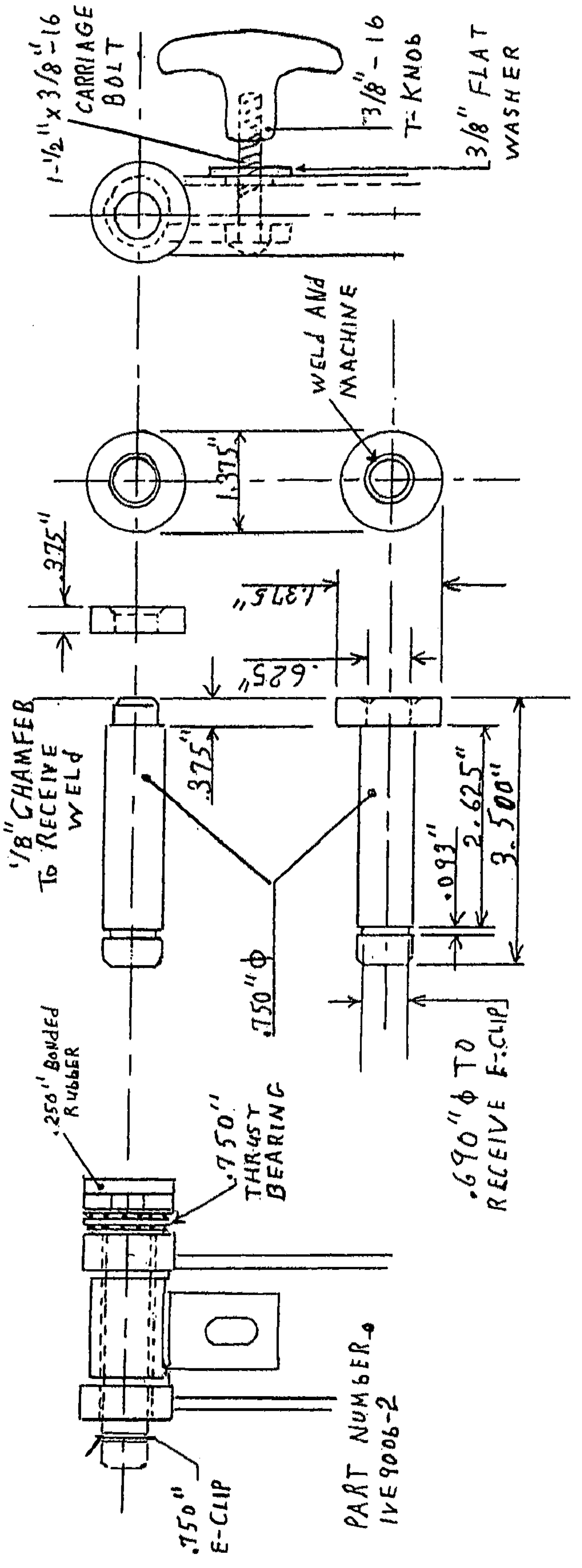
FIG. 13 Depicts a detailed manufacturing drawing for the rotating spindle mechanism which is an integral part of the tail stock.
Figure 14:
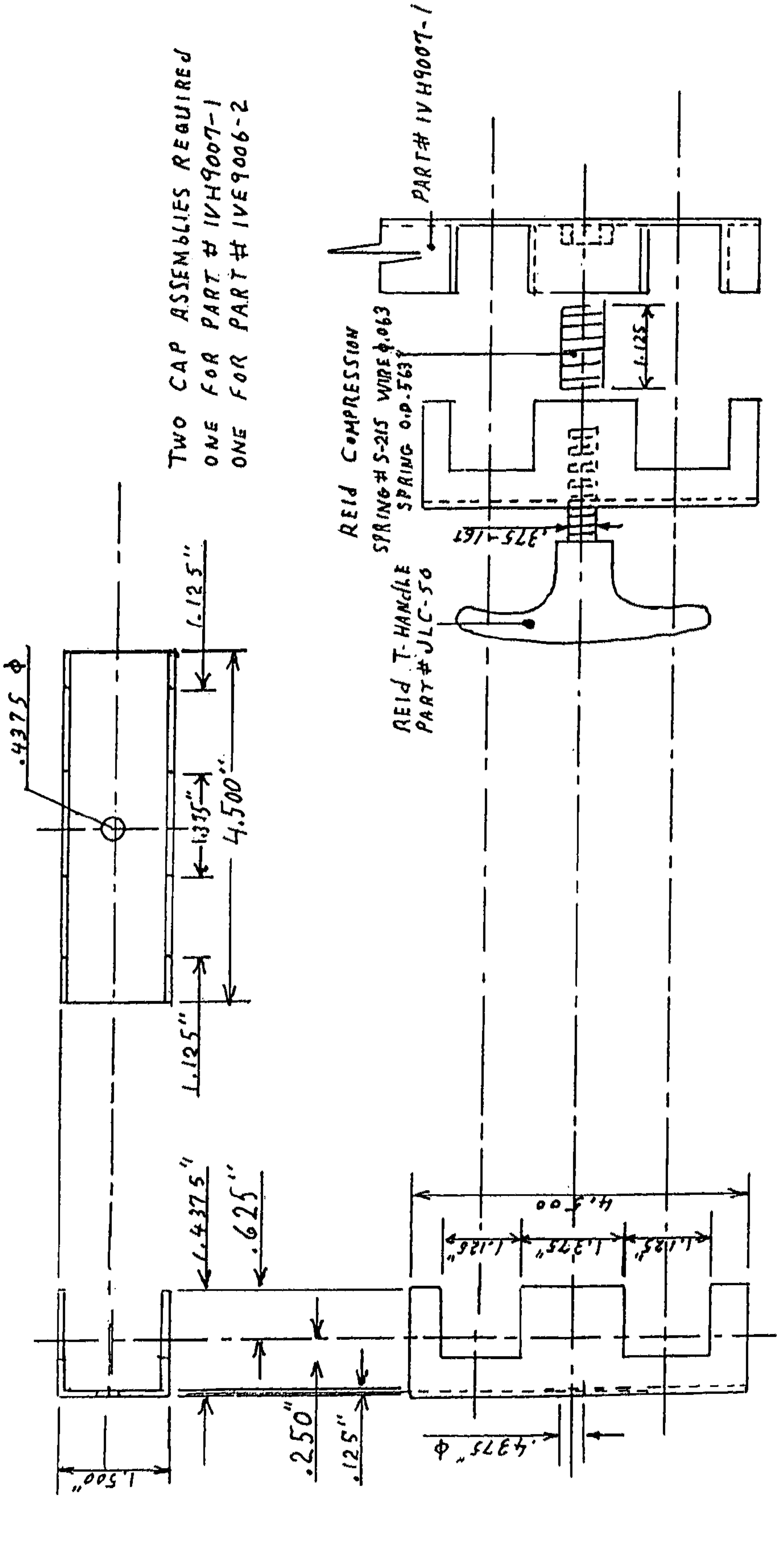
FIG. 14 Depicts a manufacturing drawing for the locking mechanism for securing the head and tail stock assembly to the square rod assembly.
Figure 15:
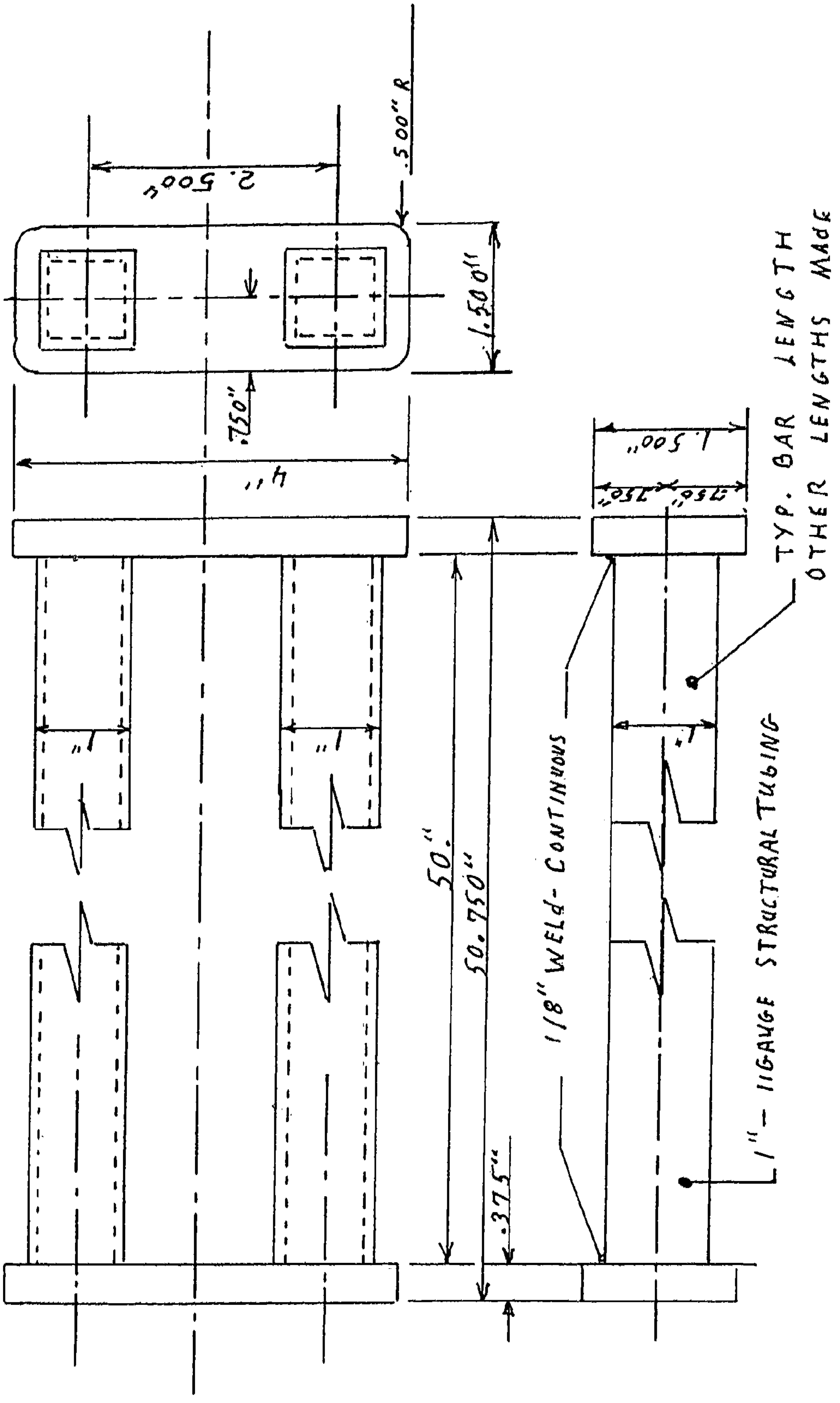
FIG. 15 Depicts a manufacturing drawing for the square rod assembly

The invention claimed is:

1. A carving vise comprising:

head stock assemblies independently movable along square rods to position a carving object at ideal locations relative to the mounting base/thimble assembly for improve carving efficiency and reduced carvers fatigue, interchangeable square rods, a brake mechanism having a friction washer for securing vertical positions from 0 to 90 degrees with non interference brake release, further having a brake release lever employing a spider nut; a headstock assembly having a press screw and a tailstock locking mechanism to allow 360 degrees rotation, a locking cap release for translational movement of head and tailstock; and a means for independent head and tailstock translational movement.

* * * * *